(12) United States Patent
Thompson et al.

(10) Patent No.: US 11,124,970 B2
(45) Date of Patent: Sep. 21, 2021

(54) ENHANCED AWNING CANOPY ASSEMBLY

(71) Applicant: Carefree/Scott Fetzer Company, Broomfield, CO (US)

(72) Inventors: Scott Thompson, Aspen, CO (US); Gregory Keith Heimbuck, Arvada, CO (US); David Thomas McMillan, Louisville, CO (US)

(73) Assignee: Carefree/Scott Fetzer Company, Bloomfield, CO (US)

( * ) Notice: Subject to any disclaimer, the term of this patent is extended or adjusted under 35 U.S.C. 154(b) by 531 days.

(21) Appl. No.: 15/948,769

(22) Filed: Apr. 9, 2018

(65) Prior Publication Data
US 2018/0291633 A1 Oct. 11, 2018

Related U.S. Application Data

(60) Provisional application No. 62/483,018, filed on Apr. 7, 2017.

(51) Int. Cl.
*E04F 10/06* (2006.01)
*F21W 131/107* (2006.01)
*H04R 1/02* (2006.01)

(52) U.S. Cl.
CPC ...... *E04F 10/0666* (2013.01); *E04F 10/0614* (2013.01); *E04F 10/0625* (2013.01); *E04F 10/0629* (2013.01); *E04F 10/0648* (2013.01); *E04F 10/0659* (2013.01); *F21W 2131/107* (2013.01); *H04R 1/023* (2013.01); *H04R 1/028* (2013.01)

(58) Field of Classification Search
CPC .............. E04F 10/0666; E04F 10/0614; E04F 10/0625; E04F 10/0629; E04F 10/0648; E04F 10/0659
See application file for complete search history.

(56) References Cited

U.S. PATENT DOCUMENTS

| | | | |
|---|---|---|---|
| 6,971,433 B2 | 12/2005 | Wagner et al. | |
| 7,116,795 B2* | 10/2006 | Tuason | H04R 1/021 381/386 |
| 7,117,565 B2* | 10/2006 | Brutsaert | E04F 10/0618 16/386 |
| 7,544,332 B2* | 6/2009 | De Silva | A01M 1/2077 239/53 |

(Continued)

*Primary Examiner* — Daniel P Cahn
*Assistant Examiner* — Abe Massad
(74) *Attorney, Agent, or Firm* — Tarolli, Sundheim, Covell & Tummino LLP; John A. Yirga, Esq.

(57) ABSTRACT

An awning assembly and method of construction is disclosed herein. The awning assembly comprising a first main arm for coupling to a dwelling, a second main arm rotatably coupled to the first main arm at a first end and supportingly coupled to a roll bar at a second end, the roll bar coupled to a canopy, and a hard wire connection housed within the first main arm for coupling to a power source. The awning assembly further comprising a detachable attachment module coupled to the first end of the second main arm and functionally coupled to the hard wire connection, the detachable attachment module comprising a plurality of electrical components, the plurality of electrical components comprising at least one of a microphone, a heating element, an input/output port, an image capture device, a speaker, an illumination source, and a transceiver.

20 Claims, 15 Drawing Sheets

(56) References Cited

U.S. PATENT DOCUMENTS

| | | | | |
|---|---|---|---|---|
| 9,470,012 | B2* | 10/2016 | Shargani | E04F 10/0633 |
| 2004/0221882 | A1* | 11/2004 | Watson | A45B 3/00 |
| | | | | 135/16 |
| 2005/0039861 | A1* | 2/2005 | Faludy | E04F 10/0666 |
| | | | | 160/66 |
| 2014/0262070 | A1* | 9/2014 | Greer | E04F 10/0692 |
| | | | | 160/127 |
| 2014/0275885 | A1 | 9/2014 | Isaacson et al. | |
| 2014/0355806 | A1* | 12/2014 | Graff | H04R 1/2834 |
| | | | | 381/334 |
| 2017/0295658 | A1* | 10/2017 | Whitmire | H05K 5/0221 |
| 2017/0318923 | A1* | 11/2017 | Gharabegian | A45B 17/00 |

* cited by examiner

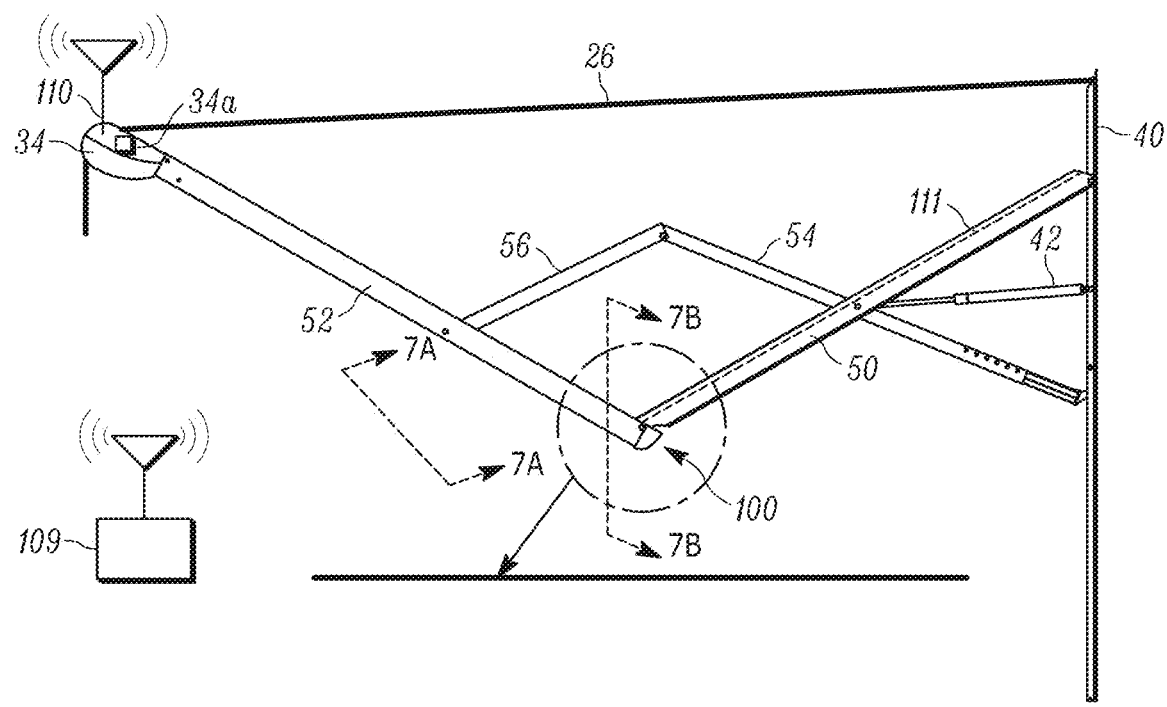
FIG. 7
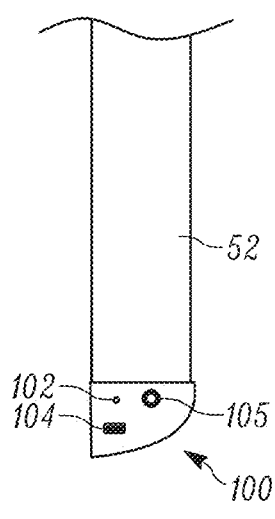 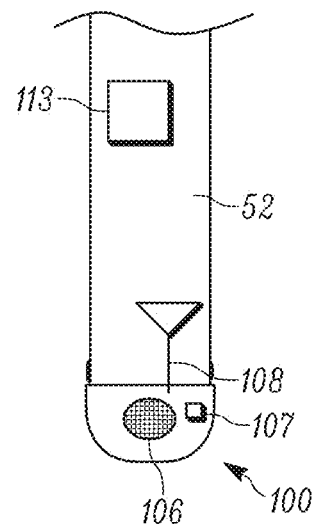
FIG. 7A          FIG. 7B

ENHANCED AWNING CANOPY ASSEMBLY

CROSS-REFERENCE TO RELATED APPLICATIONS

The present application claims priority under 35 U.S.C. § 119(e) to currently U.S. Provisional Patent Application Ser. No. 62/483,018 filed Apr. 7, 2017 entitled ENHANCED AWNING CANOPY ASSEMBLY. The above-identified application is incorporated herein by reference in its entirety for all purposes.

FIELD OF THIS DISCLOSURE

The present disclosure relates to an enhanced awning canopy assembly, and more particularly, an awning assembly allowing for wireless control options integrated into the awning assembly and providing communications and interaction between the awning assembly and a remote user.

BACKGROUND

An awning is a welcome addition to a house, recreational vehicle, or other dwelling. The awning typically provides increased enjoyment of an outdoor area surrounding the dwelling. The awning can cast a shaded area that creates an escape from direct sunlight, thereby providing a space in which an occupant of the dwelling may relax. The shaded area created by the awning contributes to the relaxation of the occupant in that there is a perceived decrease in temperature and, thus, generally becomes more comfortable. The awning as well advantageously protects occupants underneath from precipitation.

Known awning structures generally consist of a base that is permanently affixed to the dwelling, and a canopy that is removably attached to the base. Conventional awning structures are discussed in detail further in U.S. Pat. No. 6,971,433 assigned to Carefree/Scott Fetzer Company. U.S. Pat. No. 6,971,433 is incorporated herein by reference in its entirety for all purposes.

SUMMARY

One aspect of the present disclosure comprises an awning assembly comprising a first main arm for coupling to a dwelling, a second main arm rotatably coupled to the first main arm at a first end and supportingly coupled to a roll bar at a second end, the roll bar coupled to a canopy, and a hard wire connection housed within the first main arm for coupling to a power source. The awning assembly further comprising a detachable attachment module coupled to the first end of the second main arm and functionally coupled to the hard wire connection, the detachable attachment module comprising a plurality of electrical components, the plurality of electrical components comprising at least one of a microphone, a heating element, an input/output port, an image capture device, a speaker, an illumination source, and a transceiver.

Another aspect of the present disclosure comprises a method of assembling an awning assembly comprising forming a first main arm for coupling to a dwelling, rotatably coupling a second main arm to the first main arm at a first end of the second main arm, and supportingly coupling a second end of the second main arm to a roll bar, the roll bar coupled to a canopy. The method further comprising housing a hard wire connection within the first main arm for coupling to a power source and forming a detachable attachment module for coupling to the first end of the second main arm and the hard wire connection, the detachable attachment module comprising a plurality of electrical components, the plurality of electrical components comprising at least one of a microphone, a heating element, an input/output port, an image capture device, a speaker, an illumination source, and a transceiver.

Yet another aspect of the present disclosure comprises an awning assembly comprising a first main arm for coupling to a dwelling, a second main arm rotatably coupled to the first main arm at a first end and supportingly coupled to a roll bar at a second end, the roll bar coupled to a canopy, and a hard wire connection housed within the first main arm for coupling to a power source. The awning assembly further comprising a detachable attachment module coupled to the first end of the second main arm and functionally coupled to the hard wire connection, the detachable attachment module comprising a plurality of electrical components, the plurality of electrical components comprising at least one of a microphone, a heating element, an input/output port, an image capture device, a speaker, an illumination source, and a transceiver. The detachable attachment module is located a first distance away from the roll bar when the awning is in an extended position, the roll bar is a second distance from the dwelling in the extended position, and the first distance is less than seventy percent of the second distance.

BRIEF DESCRIPTION OF THE SEVERAL VIEWS OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which:

FIG. 7 is a side elevation view of FIG. 3;

FIG. 7A is a magnified section view of FIG. 7 taken along section lines 7A-7A;

FIG. 7B is a magnified section view of FIG. 7 taken along section lines 7B-7B;

Figure 1:
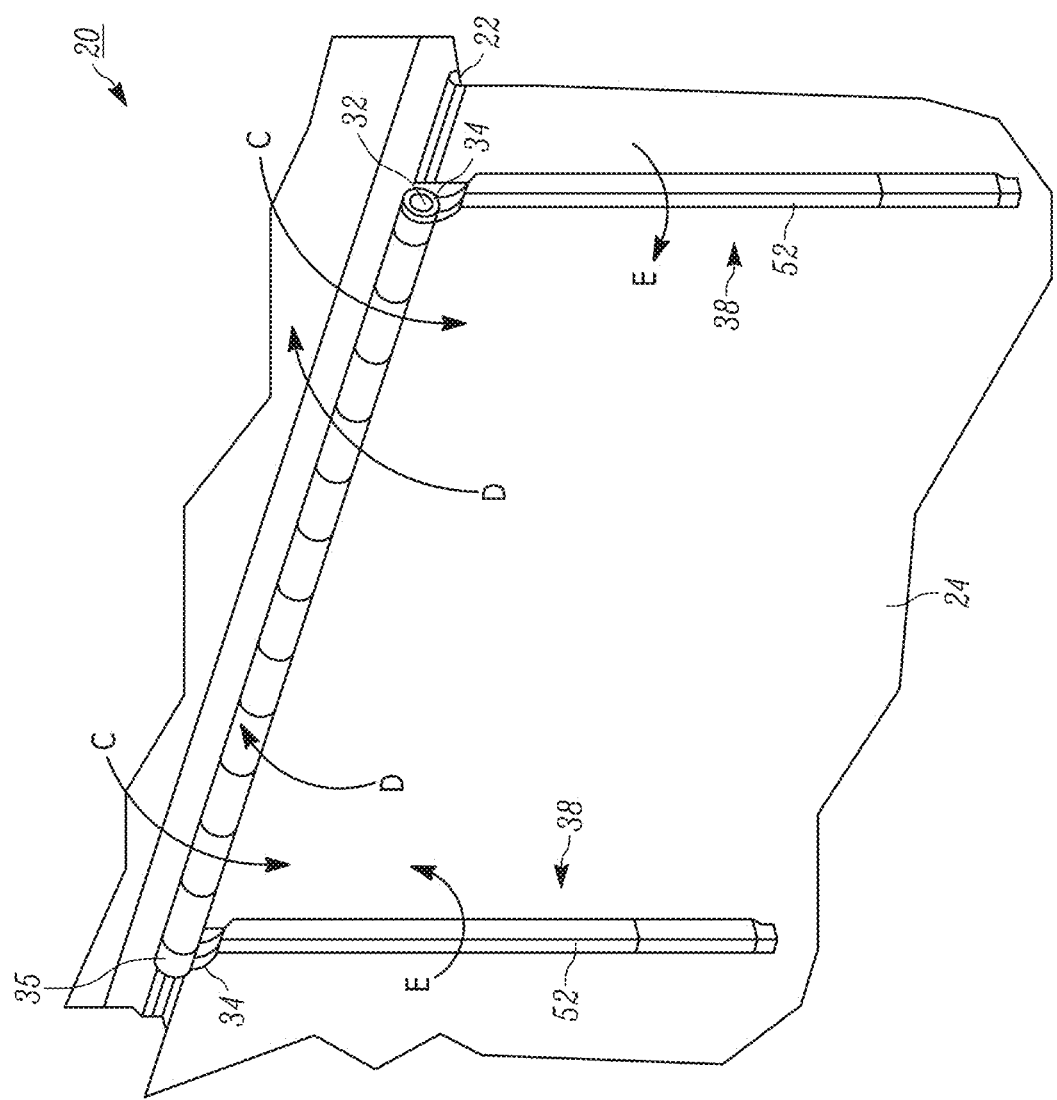
FIG. 1 is a side elevation view of an awning canopy assembly in a retracted position in accordance with one example embodiment of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Referring now to the figures generally wherein like numbered features shown therein refer to like elements having similar characteristics and operational properties throughout unless otherwise noted. The present disclosure relates to an enhanced awning canopy assembly, and more particularly, an awning assembly allowing for wireless control options integrated into the awning assembly and providing communications and interaction between the awning assembly and a remote user and/or device.

Now referring to FIGS. 1-5, an awning assembly 20 is illustrated. The awning assembly 20 includes a flexible awning canopy 26 that is mounted to a vertical support surface 24, which might be for example, the side wall of a recreational vehicle, mobile home, a recreational vehicle slide-out, or more permanent building structure. The flexible awning canopy 26 includes an inner or proximal edge 28 secured to a support rail 22 and an outer edge 30 secured to a roll bar 32, which can be motor, manual, or spring driven by one or more motors 34, gears, or springs that are operatively connected to, and maintained by, a support system 36 in the form of arms, such as pair of scissor-type arms 38, horizontally extending arms, or the like.

Figure 4:
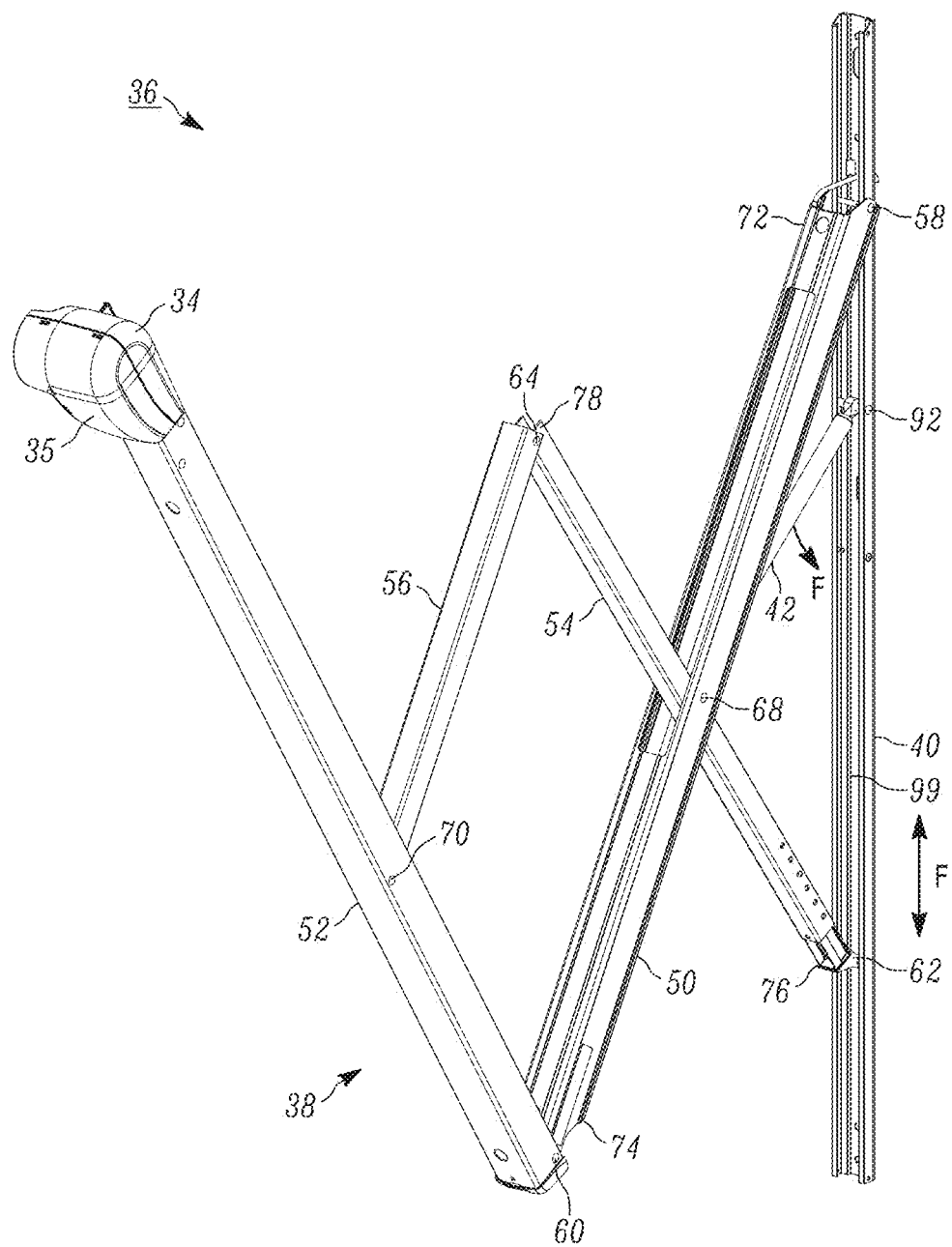
FIG. 4 is a perspective view of an awning canopy assembly support system constructed in accordance with one example embodiment of the present disclosure.
Figure 5:
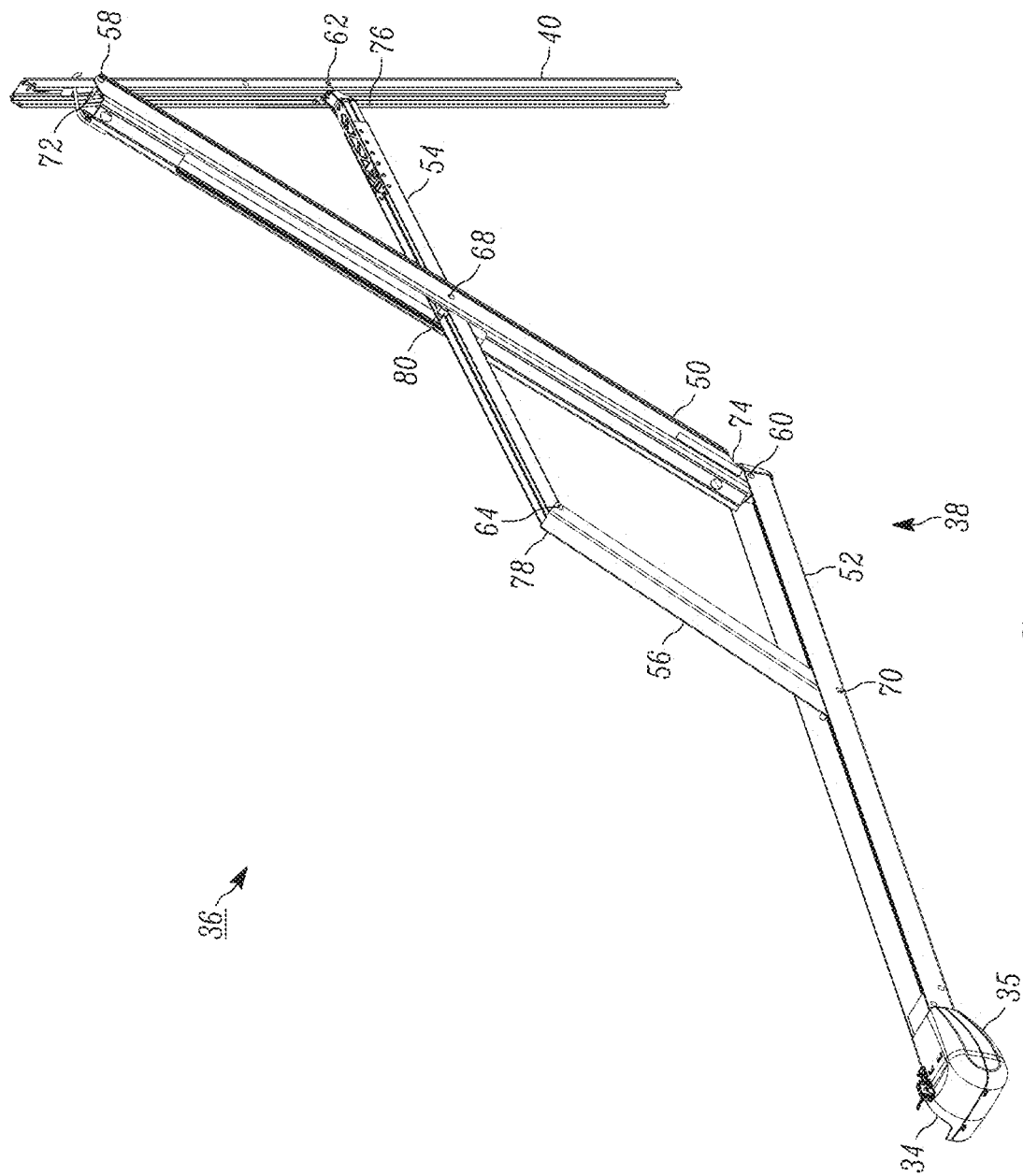
FIG. 5 is a second perspective view of an awning canopy assembly support system in accordance with another example embodiment of the present disclosure.
Figure 6:
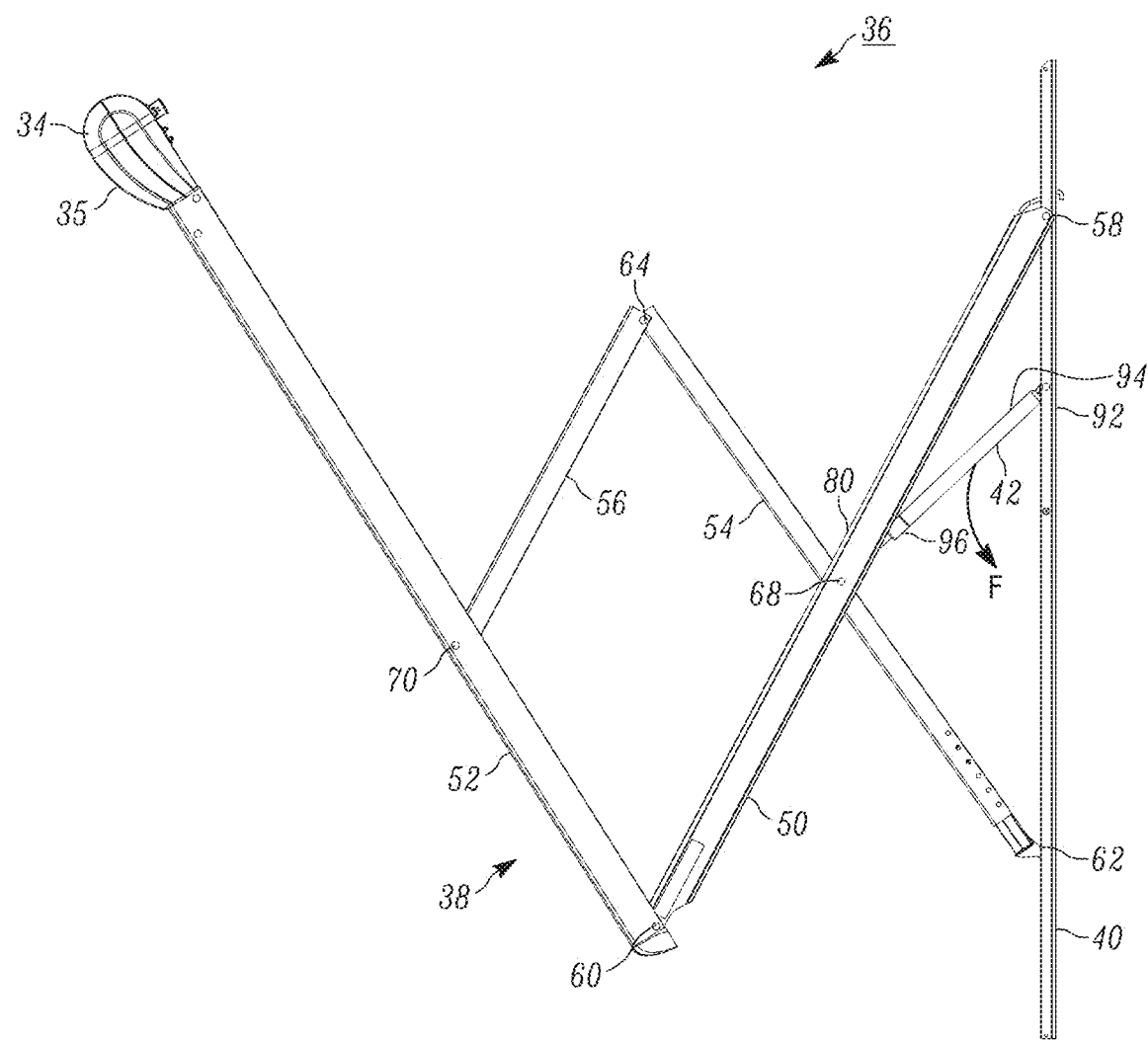
FIG. 6 is a side elevation view of FIG. 4.

In the illustrated example embodiment of FIG. 1, the motors 34 (e.g., one or more motors) are hidden or enclosed to be protected from the elements in respective housings or covers 35. The covers 35 are typically made from plastic or metal. In the illustrated example embodiment, the scissor-type arms 38 are constructed of metal, such as aluminum, but could be made of other materials of similar weight and strength. It would be appreciated by one having ordinary skill in the art, that various other types of extensions arms are contemplated and would likewise be constructed of metal, such as aluminum, but could be made of other materials of similar weight and strength An example support system 36 is shown in further detail in FIGS. 4-6 including one of two scissors-type arms 38 (that support the awning assembly 20 only one of the two arms is shown in FIGS. 4-6) mounted on a vertical track 40 that during use would attach to the support surface 24. It would be appreciated that different arm structures would function with various connections means to a dwelling. The support system 36 is shown extended in FIGS. 3 and 5 with the awning assembly 20 in the extended position. While the assembly 20 is fully retracted, as illustrated in FIG. 1, it will be appreciated that the support system 36 is vertically disposed and in close adjacent relationship with the track 40 during use. As will be appreciated, and as shown in the illustrated example embodiment of FIG. 1, as the motors 34 are driven in a first or second direction, represented by arrows C and D, respectively, the awning canopy 26 is rolled onto or unrolled from the roll bar 32, causing the awning 20 to retract or extend, respectively. The awning 20 retracts or extends in cooperation with gas springs 42 associated with the respective support arms 38. Responsive to the roll bar 32 being rotated in the first direction C to retract the awning assembly 20 by wrapping the awning canopy 26 about the roll bar, the support arms 38 are forced to retract in direction A against the bias of the gas springs 42 until the awning is in the fully retracted first position illustrated in FIG. 1.

Figure 2:
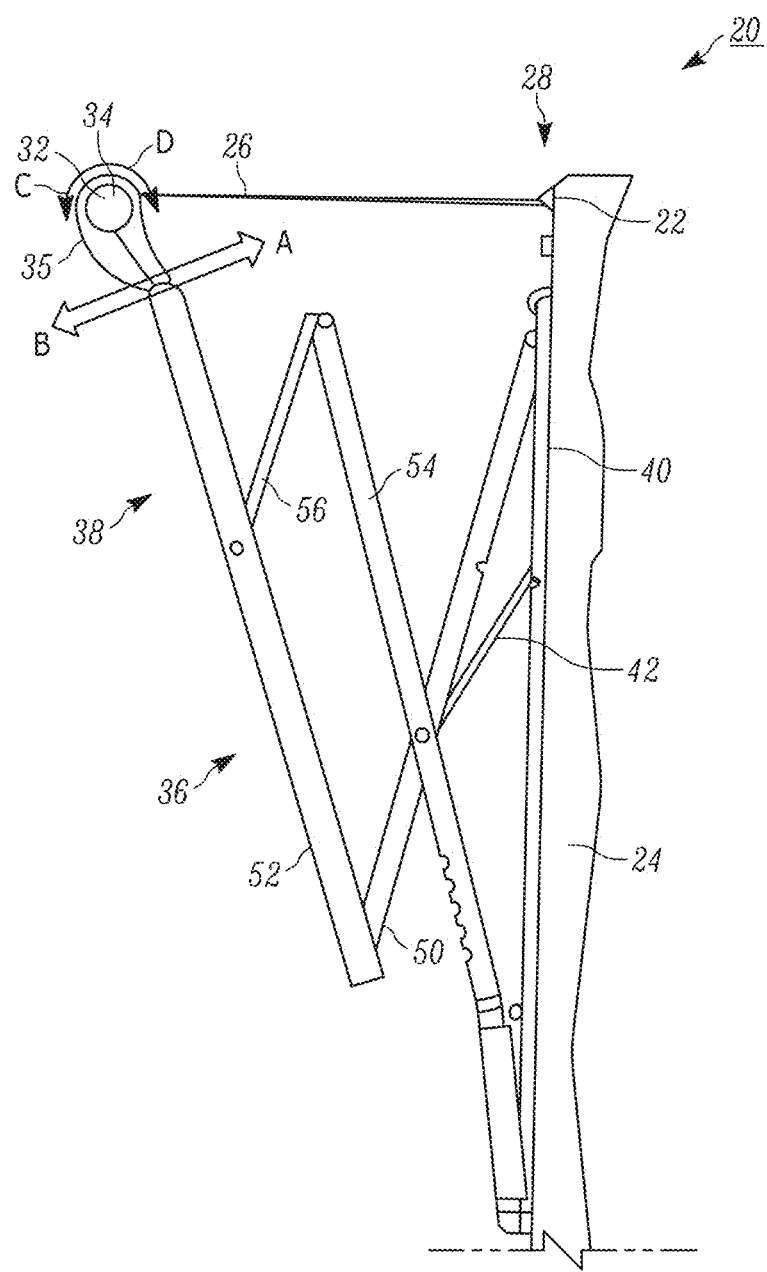
FIG. 2 is a left side elevation view of an awning canopy assembly in a partially expanded or partially open position in accordance with one example embodiment of the present disclosure.
Figure 3:
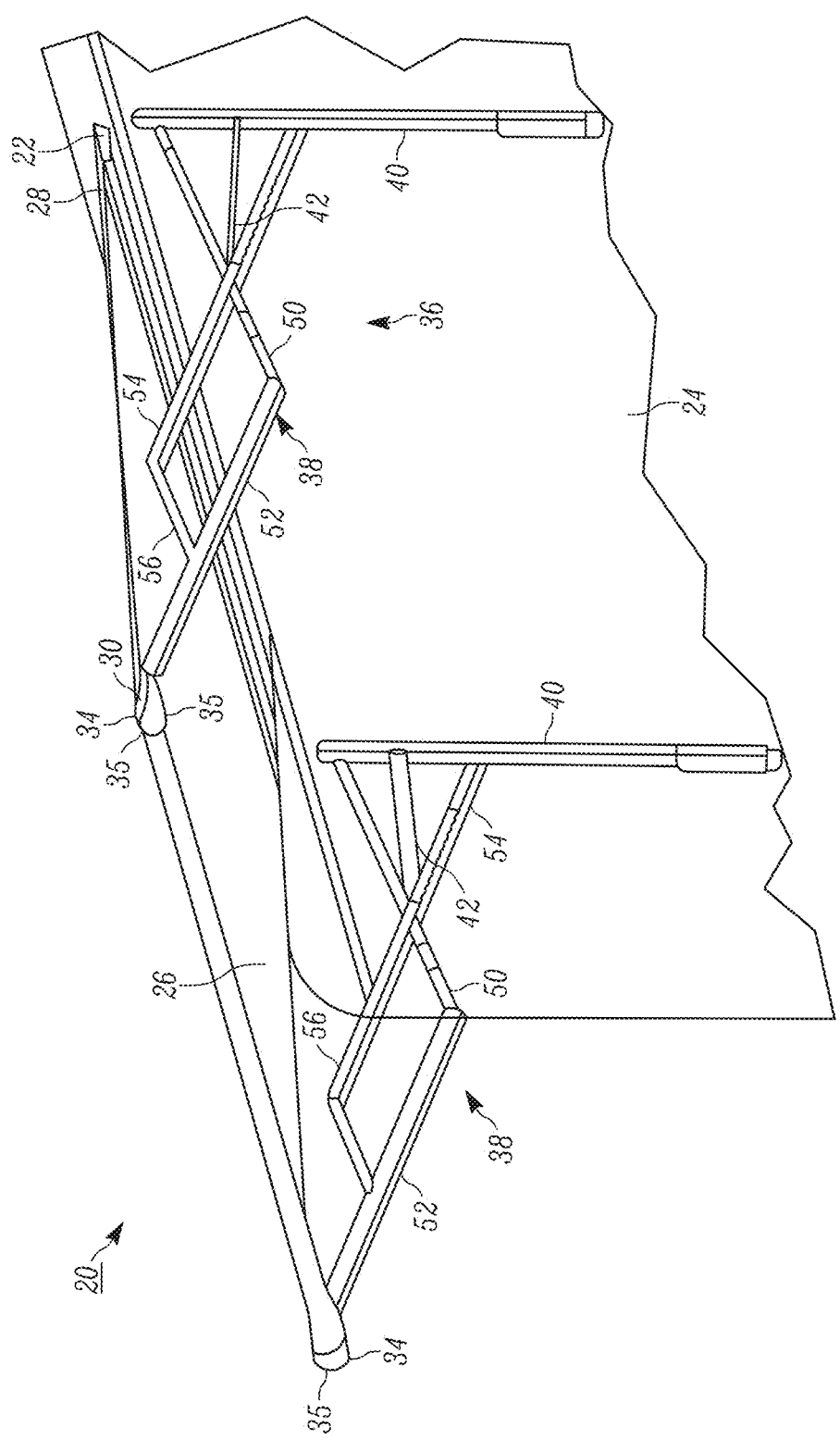
FIG. 3 is a perspective view of an awning canopy assembly in an open or expanded position in accordance with one example embodiment of the present disclosure.

To open the awning assembly 20, the roll bar 32 is rotated as shown in FIG. 2 in the second direction D to extend the awning in direction B by unwrapping the awning canopy 26 from the roll bar. The support arms 38 are assisted in extending by the bias of the gas springs 42 until fully extended to the second position illustrated in FIGS. 3 and 5.

It would be appreciated by one having ordinary skill in the art that additional example embodiments of the awning assembly 20 are contemplated. In one such example embodiment, the awning assembly 20 has support arms 38 that retract up and/or rotate inwards such as towards the roll bar 32 indicated by arrows E in FIG. 1 by a fixture assembly (not shown). Stated another way, the support system 36 when in the contracted position (see FIG. 1) can rotate such that the support system 36 that includes the vertical tracks 40 are parallel with the roll bar 32.

As shown in the example embodiments of FIGS. 4-6, the support system 36 of the awning canopy assembly 20 is illustrated. In one example embodiment, the support system 36 comprises a first support of a first side of the awning 20, wherein a mirror image of the support system 36 comprises a second support of a second side of the awning. The support system 36 comprises first and second main members 50, 52 and first and second supplemental members 54, 56, respectively. Each of the members 50-56 in the illustrated example embodiment are formed from metal, plastic, or the like. In one example embodiment, the members 50-56 are formed from extruded aluminum channeling.

In the illustrated example embodiment, the first member 50 is rotatably attached to the vertical track 40 by a fixed pin 58 that passes through both the first member and track at a first end 72 of the first member. At a second end 74 of the first main member 50, a rotating pin 60 couples the first main member to the second main member 52, such that the two main members have relative rotation about the pin 60 as the awning assembly 20 moves between the fully retracted first position illustrated in FIG. 1 to the fully extended the second position illustrated in FIGS. 3 and 5.

A slideable pin 62 allows for translation of the first supplemental member 54 about and within the vertical track 40 in the directions of arrows F in FIG. 4. The slideable pin 62 further allows for rotational pivoting of the first supplemental member 54 at a first end 76. At a second end 78 of the first supplemental member 54 a rotating pin 64 couples the first supplemental member to the second supplemental member 56, such that the two supplemental members have relative rotation about the pin 64 as the awning assembly 20 moves between the first and second positions. The opposite end of the second supplemental member 56 is rotatably coupled to a rotatable pin 70 that is fixedly attached to the second main member 52. Additional information about the support structure 36 can be found in U.S. Published Patent Application No. US2017/0275885 entitled Awning Canopy Assembly, which is assigned to CAREFREE/SCOTT FETZER COMPANY, the Applicant of the subject application (hereinafter "the '885 Publication). The '885 Publication is incorporated herein in its entirety and for all purposes.

Located substantially about the medial point along the first main member 50 and the first supplemental member 54 is a hinge pin 68. The hinge pin 68 allows for relative rotation of the first members 50, 54 during the opening and closing of the awning canopy assembly 20.

Illustrated in FIGS. 4 and 6, but omitted from FIG. 5 as part of the support system 36 is gas spring 42. The gas spring 42 is rotatably connected to the vertical track 40 by a fixed pin 92 at a first end 94 of the gas spring. The gas spring 42 is also rotatably connected to the hinge pin 68 at a second end 96 of the gas spring. The gas spring 42 acts as an assist to more readily move the awning assembly 20 between the fully retracted first position (see FIG. 1) to the fully expanded second position (see FIG. 3) with the assistance of the motor 34.

As shown in the illustrated example embodiment of FIGS. 7, 7A, and 7B, the second main member 52 comprises electrical components such as a microphone 102, a input/output port 104 (e.g., a USB port, a charging port, etc.), an image-capture device 105 (e.g., a camera, video recorder, etc.), a speaker 106, and/or a transceiver 108 located in an attachment module 100. It would be appreciated by one of ordinary skill in the art that the electrical components could be located in the first main member 52, the first supplementary member 54, the second supplementary member 56, or some combination thereof. In one example embodiment, the electrical components are in electrical communication with a controller 107. The controller 107 comprising a processor, a circuit board, a memory module, or the like. The controller 107 is in communication with a motor transceiver 110 that is communication with a motor controller 34a of the motor 34, wherein the motor controller instructs the motor to retract or extend the awning. In one example embodiment, a signal from the transceiver 108 or a connected secondary device 109 (e.g., a smart phone, a tablet, a computer, etc.) is received by the motor transceiver 110, which instructs the motor 34, via the motor controller 34a, to partially extend, fully extend, partially retract, or fully retract the awning 20. The modular design (e.g, first and second main members 50, 52, and first and second supplemental member 54, 56) allows for easy installation, or removal of different electrical components, to enable various functionalities, such as the functionalities discussed below.

It would be appreciated by one having ordinary skill in the art that the controller 107 may be in direct electrical communication with the motor 34 (e.g., via a hard line connection). It would further be appreciated by one having ordinary skill in the art that the connected secondary device 109 may be connected via a short wave wireless interconnection (e.g., Bluetooth), a wireless signal (e.g., WIFI), or a direct connection, such through the input/output port 104. The input/output port 104 comprises a charging port as well as a connection port (e.g., a USB charging port such as for portable electronic devices). The input/output port 104 comprises the charging port when connected to a hard wire connection 111 coupled to a power source (e.g, such as in a dwelling, motor home, etc.) or connected to a power supply 113 (e.g., such as a battery) comprised in the awning assembly 20.

In one example embodiment, the microphone 102, and/or a microphone located on the connected secondary device 109, detects a first audio signal (e.g., retract awning), wherein the microphone transmits the first verbal signal to the controller 107, which interprets the signal as an instruction (e.g., to retract the awning). The transceiver 108 then instructs the motor 34 via the path disclosed above, to retract the awning 20. In another example embodiment, the microphone 102 listens for weather conditions and may retract the awning assembly 20, based on, for example, high wind noises or thunder. The image-capture device 105 may confirm an all clear (i.e. no obstructions that would interfere with movement of the awning 20) for such autonomous retractions. In another example embodiment, the image-capture device 105 functions as a surveillance camera for security purposes.

Various audio signals are programmed for recognition in the controller 107 once received by an input of the controller coupled to the microphone. The various audio signals instruct the controller 107 to perform a particular operation or provide a specific output. Such operations include, but are not limited to, varying from instructions about the awning retraction and extension, to activating the speaker 106 or activating the image capture device 105. In one example embodiment, the speaker 106 may play audio from the secondary connected device 109, a radio station signal, a satellite signal, or the like received from the input/output port 104 or the transceiver 108.

In another example embodiment, the speaker 106 emits audio to instruct a user of an intended action. For example, the controller 107 after receiving the first audio signal from input 104, transceiver 108, and/or microphone 102, the speaker 106 can emit the audio signal comprising "awning retracting," or confirm the instruction, "did you request the awning be retracted" to which the user states "yes" or "no". A statement of "yes" in this example would result in the awning assembly 20 retracting. Additionally, the user can activate the image capture device 105 via an audio signal or through the connected secondary device 109, for example to take a photo of the user under the awning, or to confirm no obstacles are present, thus allowing the awning 20 to retract.

In one example embodiment, the image capture device 105 comprises a proximity sensor, wherein the presence of a user is detected. The image capture device 105 can be programmed to extend the awning in the presence of a user, and retract the awning when no users are present, or some other functionality.

Figure 8:
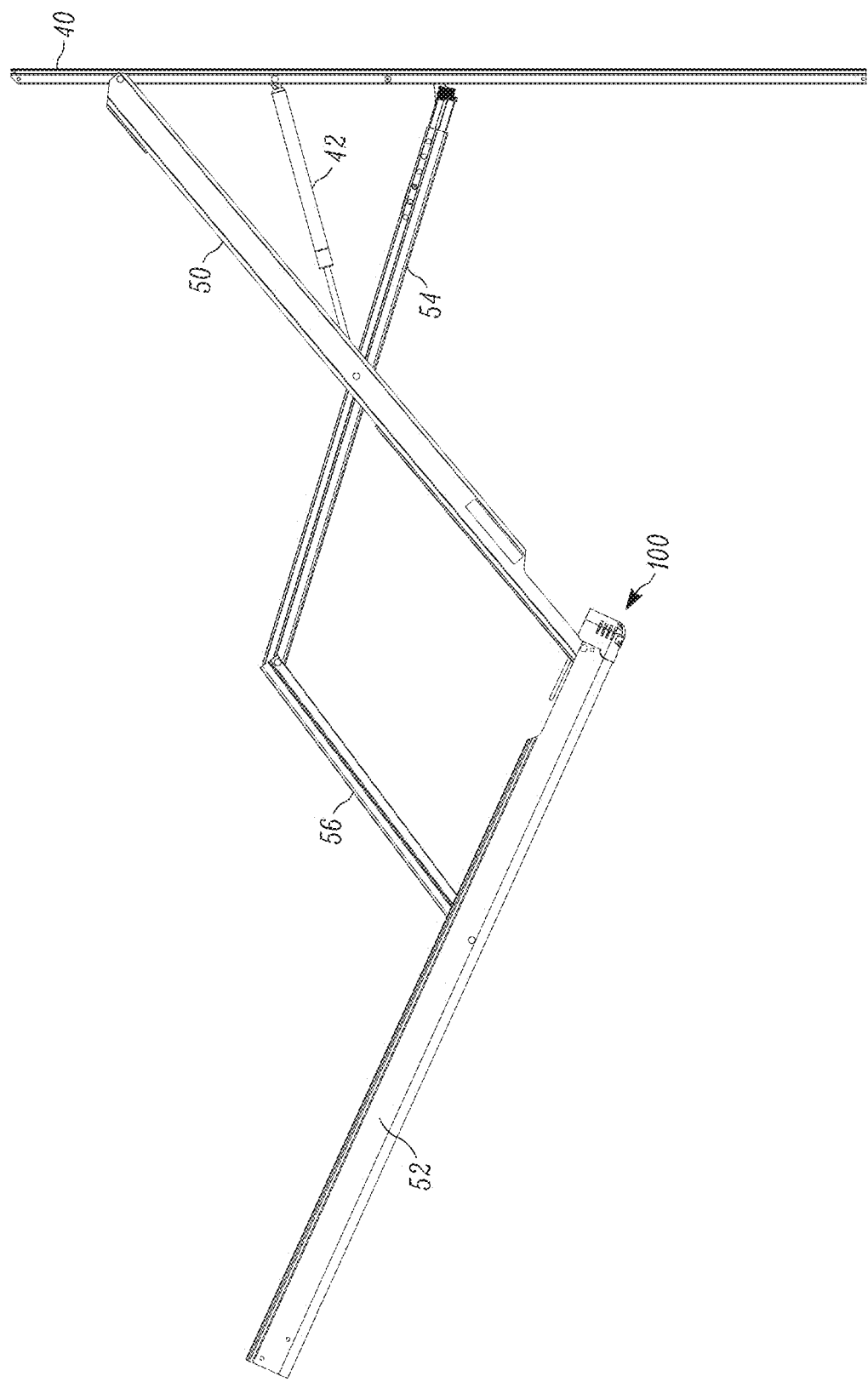
FIG. 8 is a side perspective view of an awning canopy assembly support system comprising a detachable attachment module in accordance with another example embodiment of the present disclosure.

FIG. 8 illustrates an attachment module 100 for detachably attaching to the second main arm 52. The attachment module 100 is connectable to the hard wire connection 111 and/or to the power supply 113. One or more different attachment modules 100 are attachable and detachable, as well as interchangeable, with regard to attachment to and detachment from the second main arm, and attachment to and detachment from the hard wire connection 111.

Figure 9B:
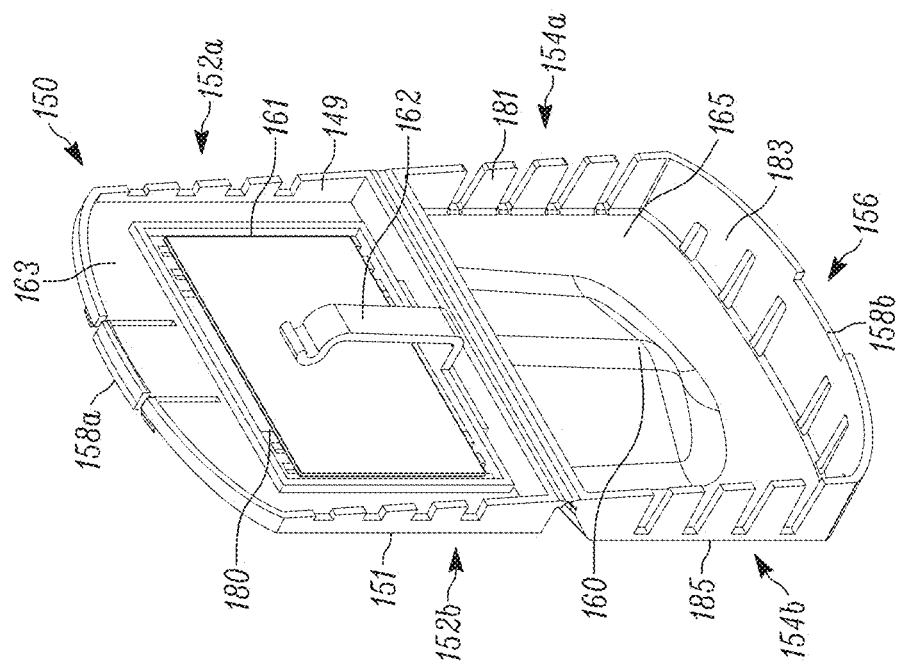
FIG. 9B is a rear perspective view of an insect repellent holder for use in the insect repellant housing of FIGS. 10A-10B.
Figure 9A:
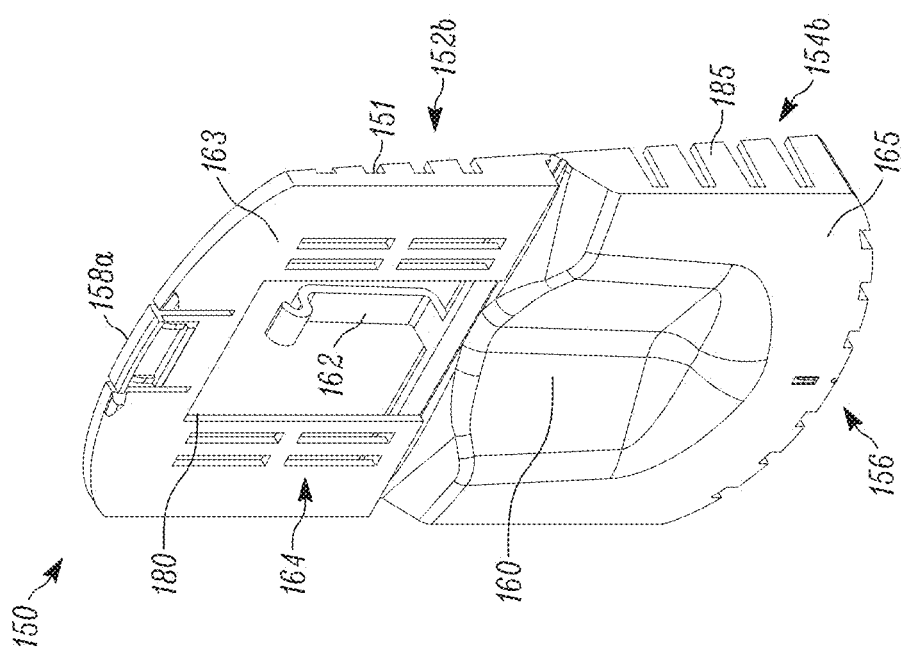
FIG. 9A is a front perspective view of an insect repellent holder for use in the insect repellant housing of FIGS. 10A-10B.
Figure 10A:
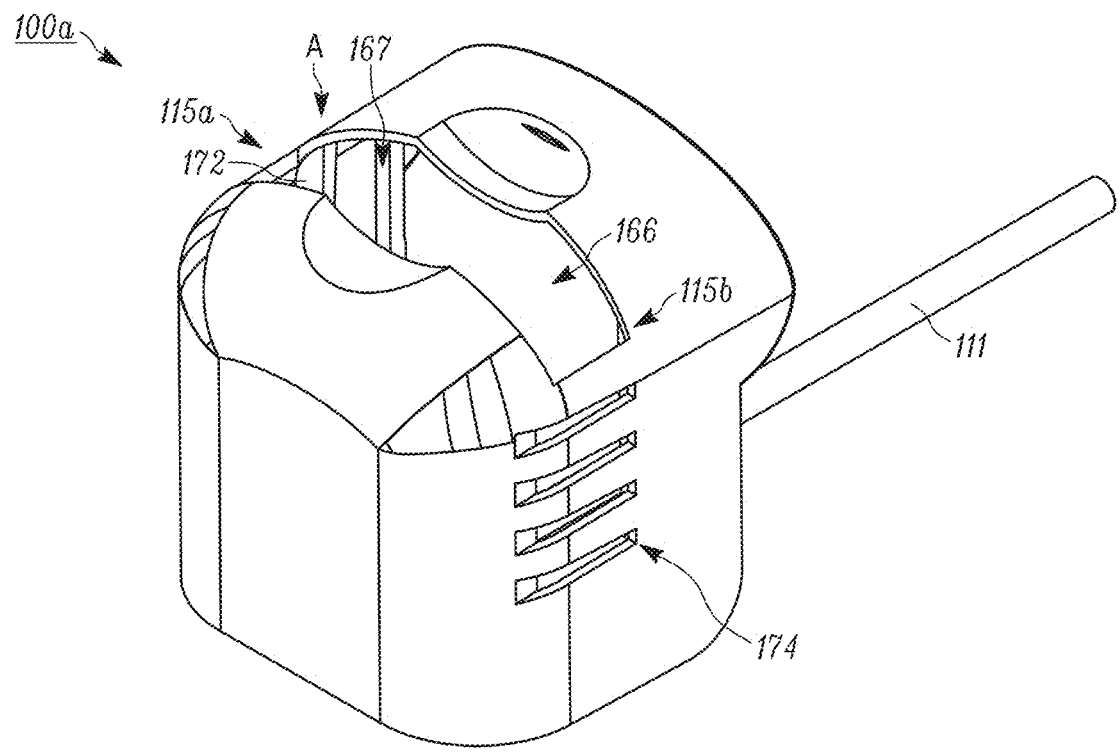
FIG. 10A is a front perspective view of an attachment module comprising an insect repellant housing for attachment to an awning canopy assembly support system in accordance one example embodiment of the present disclosure.
Figure 10B:
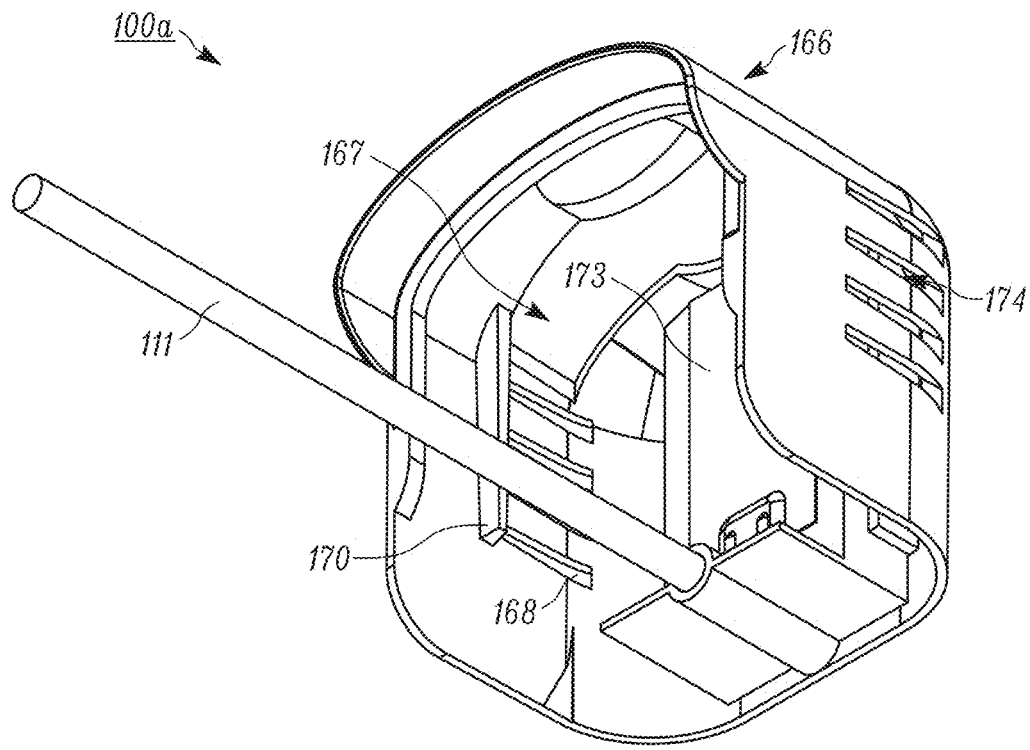
FIG. 10B is a rear perspective view of an attachment module comprising an insect repellant housing for attachment to an awning canopy assembly support system in accordance one example embodiment of the present disclosure.
Figure 11A:
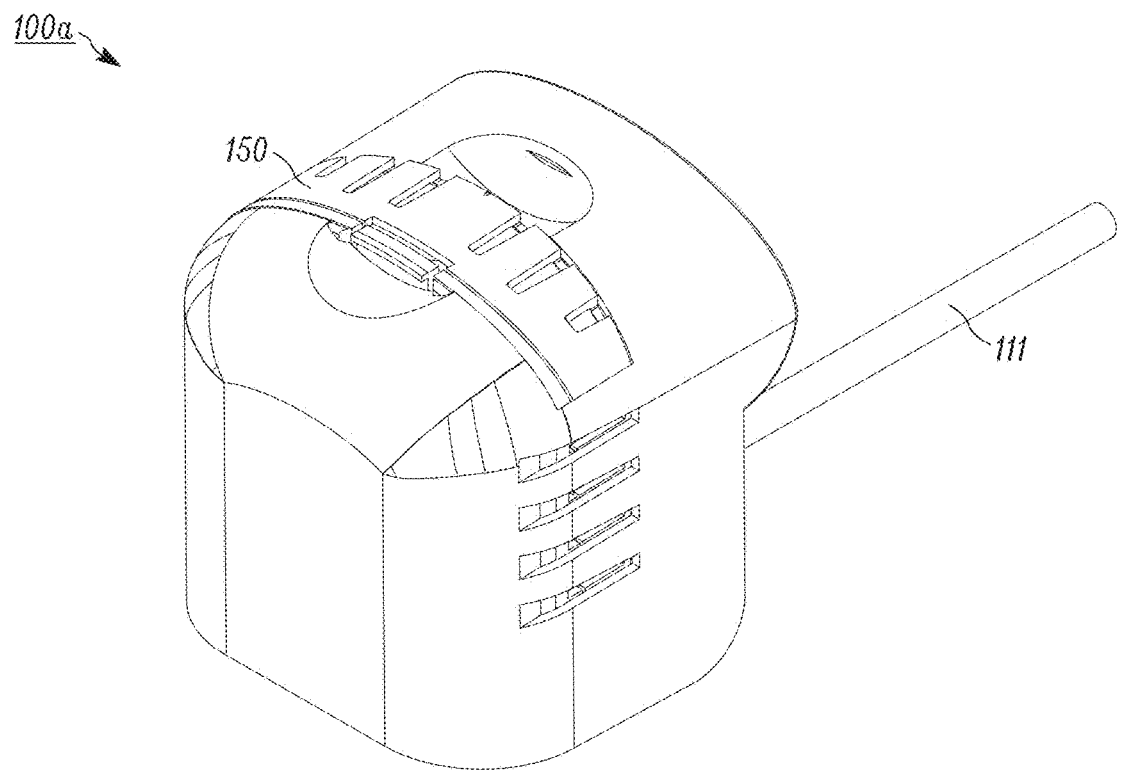
FIG. 11A is a front perspective view of an assembled attachment module comprising an insect repellant housing housing an insect repellent holder for attachment to an awning canopy assembly support system in accordance one example embodiment of the present disclosure.
Figure 11B:
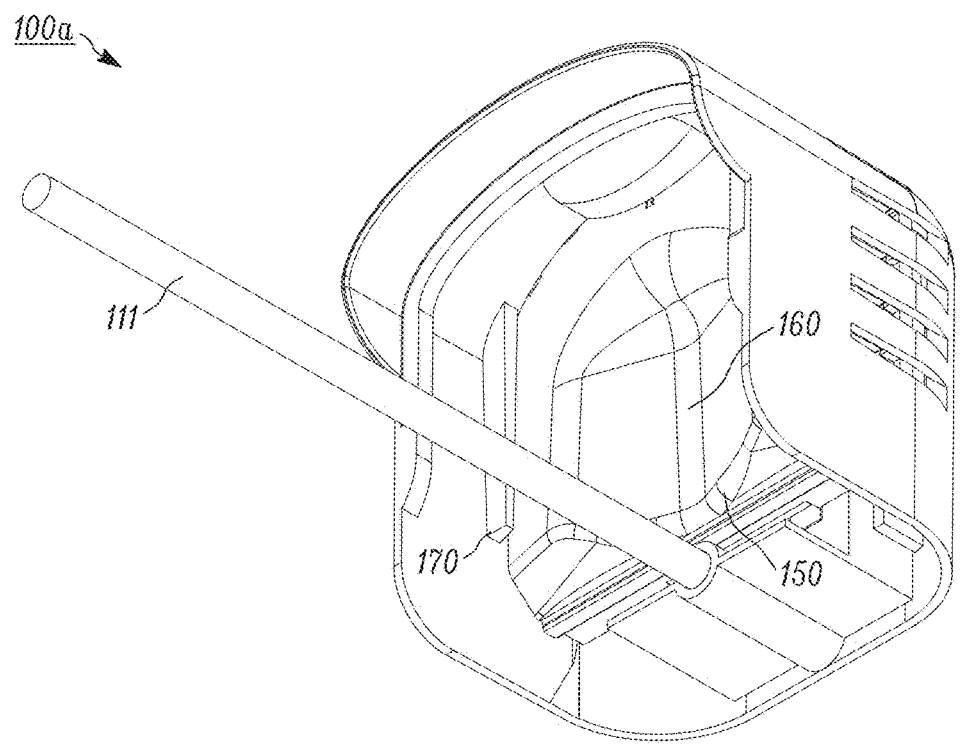
FIG. 11B is a rear perspective view of an assembled attachment module comprising an insect repellant housing housing an insect repellent holder for attachment to an awning canopy assembly support system in accordance one example embodiment of the present disclosure.

Turning to FIGS. 9-11, the attachment module 100 comprising an insect repellant housing 100*a* is illustrated. The insect repellant housing 100*a* is connected to the hard wire connection 111 and/or to the power supply 113. The hard wire connection 111 and/or the power supply 113 provides power to a heating element 173, which activates a repellent pad 161. One example repellant pad 161 is an allethrin (e.g., synthetic pyrethroids) pad, other insecticides include Citronella oil or extract, N,N-Diethyl-meta-toluamide (DEET), or the like. The insect repellent housing 100*a* comprises an insect repellant holder housing 166 for holding an insect repellant holder 150. The insect repellant holder 150 is removably housed within the insect repellant holder housing 166 via a repellant opening 167 and a support 168 and first and second guides 170*a*, 170*b*. The support 168 extending from a first side 115*a* of the repellant opening 167 to a second side 115*b* of the repellant opening and comprises an upper surface of the heating element 173. The first and second guides 170, 172 are located axially across from each other within the insect repellant housing 100*a*. The insect repellant housing 100*a* comprises a plurality of vents 174 that ventilate the insect repellant after the repellent pad is heated. The insect repellant holder 150 is inserted into the repellant opening 167 along direction A, and interacts with the support 168 and first and second guides 170, 172, such that the insect repellent holder is retained within the insect repellant housing 100*a*. Although the insect repellant housing 100*a* is illustrated with first and second guides 170, 172, other types of supports and/or guides that are configured to support the insect repellant holder 150 are contemplated.

In the illustrated example embodiment of FIGS. 9A-9B, the insect repellant holder 150 comprises a lid 163 and a base 165 that close along a hinge 167 to form a partially enclosed space. The lid 163 comprises a repellant pad clip 162 that, in conjunction with the lid, retains the repellant pad over a venting opening 180 and a plurality of vents 164. The lid 163 comprises a closing clip 158*a*, and first and second lid sidewalls 149, 151 comprising one or more vents 152*a*, 152*b*, respectively.

The base 165 comprises a heating indent 160 that aligns with the repellant pad clip 162 when the insect repellant holder 150 is closed to orient the repellant pad toward the heating element 173. The base 165 comprises a front wall 156 comprising one or more vents 156 and a closing clip indent 158*b* that frictionally attached to the closing clip 158*a* to releasably secure the insect repellant holder 150 in a closed position. The base 165 further comprises first and second base sidewalls 181, 185 having one or more vents 154*a*, 154*b*, respectfully. Further, wherein the one or more vents 152*a*, 152*b* of the first and second lid sidewalls 149, 151 align with the one or more vents 154*a*, 154*b* of the first and second base sidewalls 181, 185 when in the closed position. The insect repellant holder 150 comprises one of plastic, metal, or some combination thereof. The insect repellant holder 150 comprises dimensions that are configured to fit within the insect repellent holder housing 166.

A repellant pad 161 is inserted into the repellant pad clip 162 and the insect repellant holder 150 is closed. The closed insect repellant holder 150 is inserted into the insect repellent holder housing 166, wherein the repellant pad 161 is aligned with the heating element 173. Responsive to the repellant pad 161 being exhausted, the insect repellent holder 150 is removed from the insect repellent holder housing 166. The insect repellant holder 150 is opened, the exhausted repellant pad is removed and a new repellant pad 161 is inserted between the lid 163 and the repellant pad clip 162. The insect repellant holder 150 is closed and inserted into the insect repellant holder housing 166 for use as an insect repellant.

Figure 12:
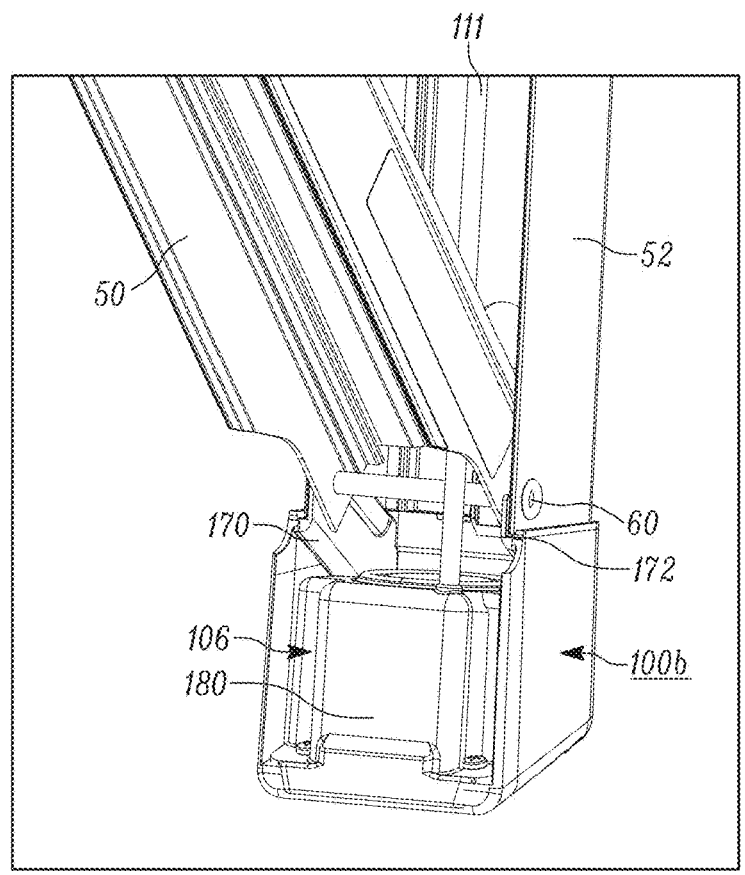
FIG. 12 is a rear perspective view of an attachment module comprising a speaker housing attached to an awning canopy assembly support system in accordance one example embodiment of the present disclosure.
Figure 13:
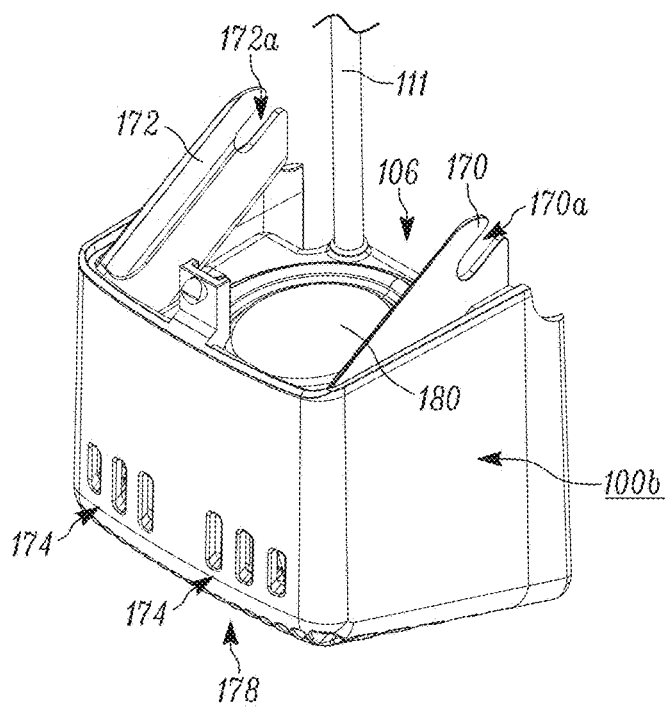
FIG. 13 is a front perspective view of an attachment module comprising a speaker housing for attachment to an awning canopy assembly support system in accordance one example embodiment of the present disclosure.
Figure 14:
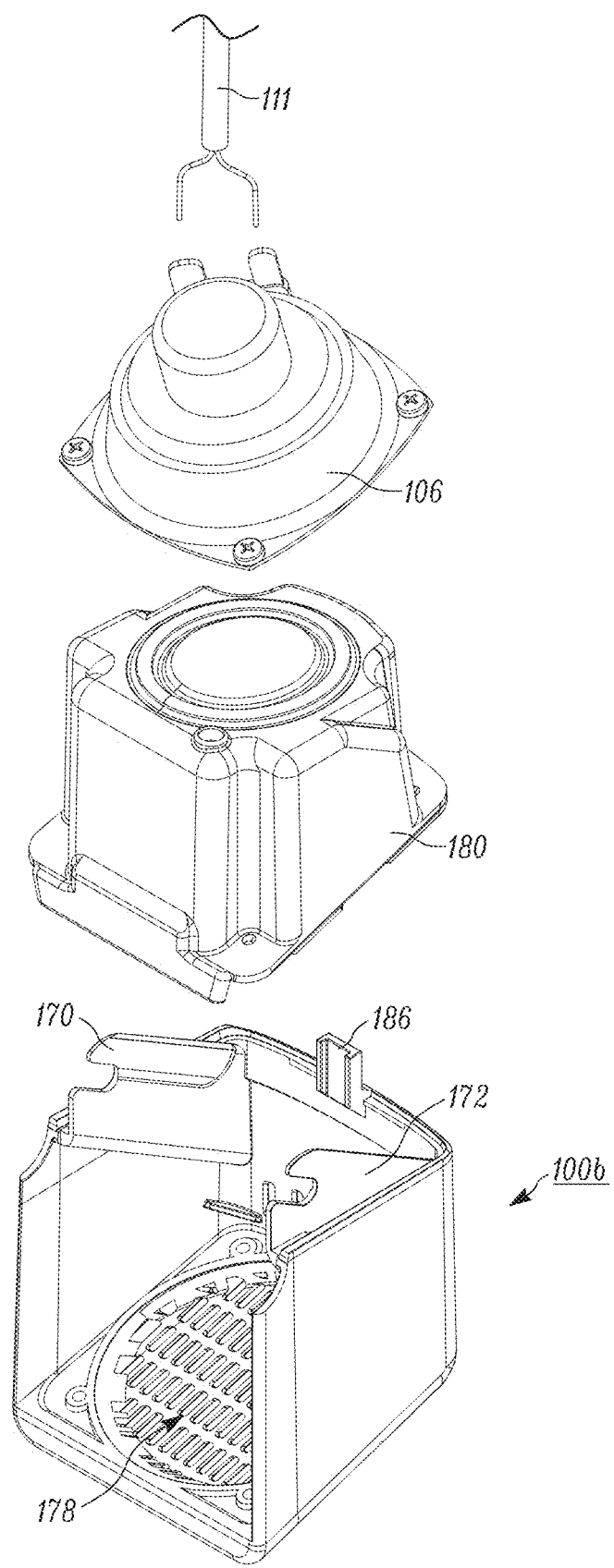
FIG. 14 is an exploded side perspective view of an attachment module comprising a speaker housing for attachment to an awning canopy assembly support system in accordance a second example embodiment of the present disclosure.

Turning to FIGS. 12-14, an attachment module 100 comprising a speaker housing 100*b* is illustrated. The speaker housing 100*b* is connected to the hard wire connection 111 and/or to the power supply 113. The speaker housing 100*b* houses the speaker 106, a speaker cover 180 and comprises first and second securing arms 170, 172. The first and second securing arms 170, 172 comprise first and second slots 170*a*, 172*a* that interact with and pivot around the rotating pin 60 during extension and retraction of the awning canopy assembly 20. The speaker cover 180 protects the speaker 106 from weather, debris, and the like, wherein the speaker is functionally connected to the hard wire connection 111 and/or to the power supply 113. The speaker housing 100*b* further comprises auditory venting 174, and 178. In the illustrated example embodiment, the speaker 106 audio output surface is positioned to face the auditory venting 178 to increase the sound quality output by the speaker. The speaker housing 100*b* additionally comprises a tension clip 186 that in conjunction with the first and second securing arms 170, 172 secures the speaker housing 100*b* to the second main member 52.

Figure 15A:
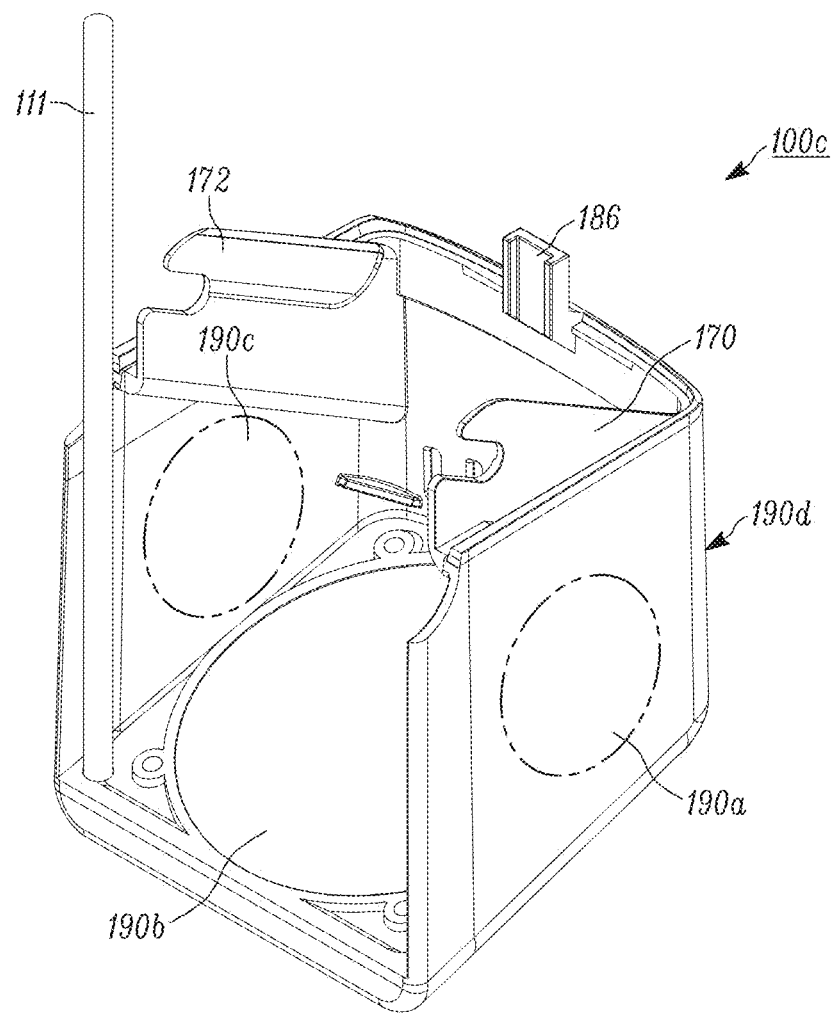
FIG. 15A is a rear perspective view of an attachment module comprising an illumination housing for attachment to an awning canopy assembly support system in accordance one example embodiment of the present disclosure.
Figure 15B:
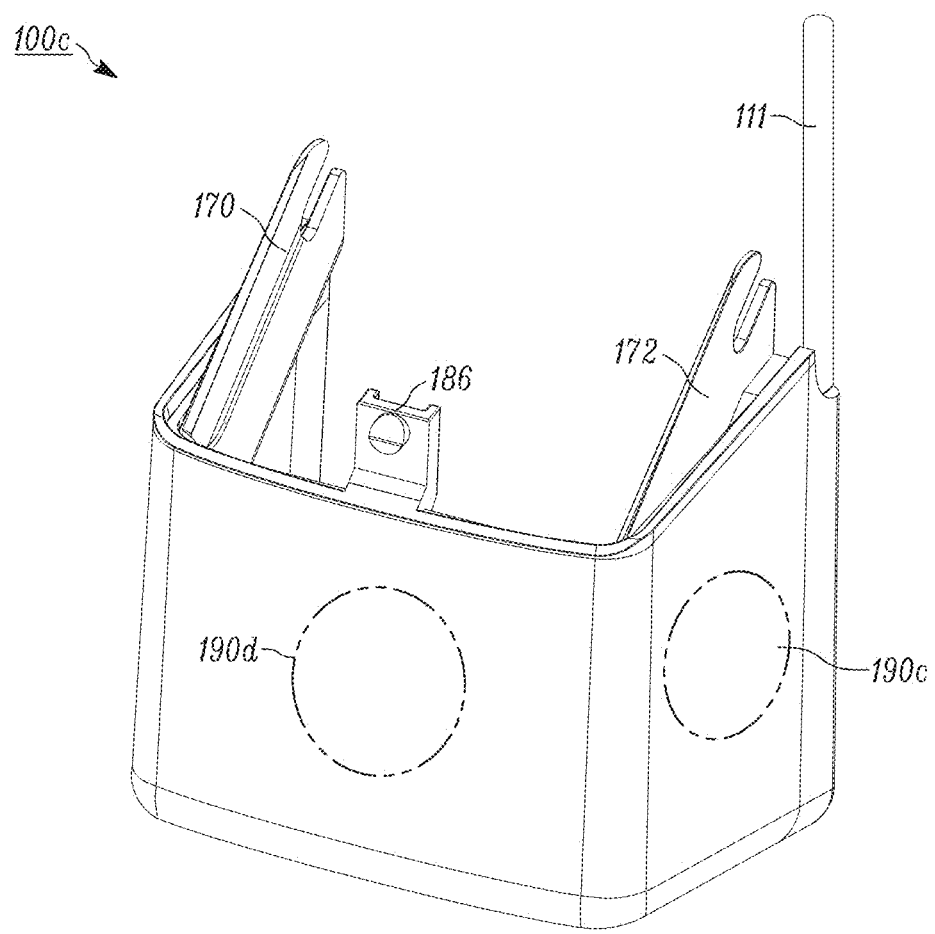
FIG. 15B is a front perspective view of an attachment module comprising an illumination housing for attachment to an awning canopy assembly support system in accordance one example embodiment of the present disclosure.

Turning to FIGS. 15A-15B, an attachment module 100 comprising an illumination housing 100*c* is illustrated. The illumination housing 100*c* is connected to the hard wire connection 111 and/or to the power supply 113. One or more illumination sources 190 are positioned around the illumination housing 100*c*, to shine light underneath the awning 20 (e.g., illumination source 190*a*), in a forward direction away from the vertical track 40 (e.g., illumination source 190*d*), in a rearward direction toward the vertical track (e.g, illumination source 190*b*), and/or away from the awning (e.g., illumination source 190*c*) when the awning is extended.

The addition of the electrical components to the awning 20, increases usability for various users. The audio signal activation allows visually impaired users to easily use the awning 20. Further, the speaker 106 can increase enjoyment by incorporating audio output (songs, stories, news, etc.) into the awning 20 experience. The user advantageously can host a group, or singular telephone/cellular call through the microphone 102 and the speaker 106, while enjoying the shade of the awning 20.

Further, the various embodiments of the attachment module 100, 100a, 100b, 100c, are ideal because the location on the second main member 52 places the component(s) in an optimal or near optimal spot for operation when the awning 20 is in the extended or retracted positions. The location of the attachment module 100, 100a, 100b, 100c is more convenient to run power to (e.g., the hard wire connection 111 is shorter in length) than typical attachments (see U.S. Pat. Pub. No. 2014/0262070A1 to Lippert Components, Inc. incorporated herein by reference for all purposes in its entirety), and allows for the various attachment modules to be easily swapped out for one another, and/or replaced. Thus, one attachment module 100, 100a, 100b, 100c of the same or different function can be attached and detached in a modular fashion.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An awning assembly comprising:
   a first main arm for coupling to a dwelling;
   a second main arm rotatably coupled to the first main arm by a rotating pin at a first end and supportingly coupled to a roll bar at a second end, the roll bar coupled to a canopy;
   a hard wire connection housed within the first main arm for coupling to a power source; and
   a detachable attachment module coupled to the first end of the second main arm and functionally coupled to the hard wire connection, the detachable attachment module comprising a plurality of electrical components, the detachable attachment module defining first and second securing arms comprising first and second slots that interact with and pivot around the rotating pin during extension and retraction of the awning assembly.

2. The awning assembly of claim 1, comprising a motor functionally attached to the roll bar to extend or retract the canopy.

3. The awning assembly of claim 2, wherein the plurality of electrical components are in electrical communication with the motor, and wherein responsive to a voice command detected by a microphone, the motor actuates the roll bar to extend or retract the canopy.

4. The awning assembly of claim 1, wherein the detachable attachment module comprises an insect repellant housing comprising a heating element functionally connected to the hard wire connection.

5. The awning assembly of claim 4, wherein the insect repellant housing comprises an insect repellent holder housing for housing a removable insect repellent holder.

6. The awning assembly of claim 5, wherein the removable insect repellent holder is configured to retain a repellent pad over the heating element when housed within the insect repellent holder housing.

7. The awning assembly of claim 4, wherein the insect repellant housing is located a first distance away from the roll bar when the awning is in an extended position, wherein the roll bar is a second distance from the dwelling in the extended position, and wherein the first distance is less than seventy percent of the second distance.

8. The awning assembly of claim 1, wherein the detachable attachment module comprises a tension clip, that in conjunction with the first and second securing arms, frictionally secures the detachable attachment module to the second main member.

9. The awning assembly of claim 1, wherein the detachable attachment module comprises a speaker housing having a speaker functionally connected to the hard wire connection.

10. The awning assembly of claim 9, wherein the speaker housing comprises a speaker cover over the speaker.

11. The awning assembly of claim 10, the speaker housing comprising auditory venting, wherein an audio output surface of the speaker is positioned to face the auditory venting, wherein the auditory venting is configured to direct sound waves under the canopy when in the extended position.

12. The awning assembly of claim 9, wherein the speaker housing is located a first distance away from the roll bar when the awning is in an extended position, wherein the roll bar is a second distance from the dwelling in the extended position, and wherein the first distance is less than seventy percent of the second distance, wherein sound output from the speaker has a highest volume output under the canopy in the extended position.

13. The awning assembly of claim 1, wherein the detachable attachment module comprises an illumination housing having one or more illumination sources functionally connected to the hard wire connection.

14. The awning assembly of claim 13, wherein the illumination housing is located a first distance away from the roll bar when the awning is in an extended position, wherein the roll bar is a second distance from the dwelling in the extended position, and wherein the first distance is less than seventy percent of the second distance.

15. The awning assembly of claim 14, wherein the illumination housing comprises an illumination source that illuminates under the canopy in the extended position.

16. An awning assembly comprising:
a first main arm for coupling to a dwelling;
a second main arm rotatably coupled to the first main arm at a first end and supportingly coupled to a roll bar at a second end, the roll bar coupled to a canopy;
a hard wire connection housed within the first main arm for coupling to a power source; and
a detachable attachment module coupled to the first end of the second main arm and functionally coupled to the hard wire connection, the detachable attachment module comprising a plurality of electrical components, wherein the detachable attachment module is located a first distance away from the roll bar when the awning is in an extended position, wherein the roll bar is a second distance from the dwelling in the extended position, and wherein the first distance is less than seventy percent of the second distance, the detachable attachment module defines first and second securing arms that define first and second arced slots, respectively, wherein the first and second securing arms are configured to engage a rotating pin coupling the first main arm to the second main arm.

17. An awning assembly comprising:
a first main arm for coupling to a dwelling;
a second main arm rotatably coupled to the first main arm at a first end and supportingly coupled to a roll bar at a second end, the roll bar coupled to a canopy;
a hard wire connection housed within the first main arm for coupling to a power source; and
a detachable attachment module coupled to the first end of the second main arm and functionally coupled to the hard wire connection, the detachable attachment module comprising a plurality of electrical components, the detachable attachment module further comprising first and second securing arms comprising first and second slots and a tension clip, that in conjunction with the first and second securing arms, frictionally secures the detachable attachment module to the second main arm, wherein the first and second securing arms are configured to engage a rotating pin coupling the first main arm to the second main arm.

18. The awning assembly of claim 17, the plurality of electrical components comprising at least one of a microphone, a heating element, an input/output port, an image capture device, a speaker, an illumination source, or a transceiver.

19. The awning assembly of claim 17, the first and second slots interacting with and pivoting around the rotating pin during extension and retraction of the awning assembly, the rotating pin rotatably linking the first main arm to the second main arm.

20. The awning assembly of claim 17, wherein the detachable attachment module comprises at least one of:
an illumination housing having one or more illumination sources functionally connected to the hard wire connection; or
a speaker housing having a speaker functionally connected to the hard wire connection.

* * * * *